(12) United States Patent
Inoue et al.

(10) Patent No.: US 7,422,825 B2
(45) Date of Patent: Sep. 9, 2008

(54) NONAQUEOUS ELECTROLYTE SECONDARY BATTERY

(75) Inventors: Kaoru Inoue, Hirakata (JP); Kiyomi Kato, Moriguchi (JP); Kohei Suzuki, Yao (JP); Shigeo Ikuta, Kawanabe-gun (JP); Yusuke Fukumoto, Moriguchi (JP); Tetsuya Hayashi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/562,438

(22) PCT Filed: Mar. 22, 2005

(86) PCT No.: PCT/JP2005/005158

§ 371 (c)(1),
(2), (4) Date: Dec. 28, 2005

(87) PCT Pub. No.: WO2005/098997

PCT Pub. Date: Oct. 20, 2005

(65) Prior Publication Data

US 2006/0188785 A1 Aug. 24, 2006

(30) Foreign Application Priority Data

| Mar. 30, 2004 | (JP) | ............................. 2004-098985 |
| Jun. 11, 2004 | (JP) | ............................. 2004-173734 |
| Jun. 22, 2004 | (JP) | ............................. 2004-183948 |

(51) Int. Cl.
*H01M 2/16* (2006.01)

(52) U.S. Cl. .................... 429/246; 429/251; 429/322; 429/231.95

(58) Field of Classification Search ................. 429/322, 429/321, 231.95, 323
See application file for complete search history.

(56) References Cited

U.S. PATENT DOCUMENTS 5,318,866 A    6/1994   Degen et al.

(Continued)

FOREIGN PATENT DOCUMENTS

CN    1094852 A    11/1994

(Continued)

OTHER PUBLICATIONS

Kim et al. "Electrochemical and physical properties of composite polymer electrolyte of poly(methyl methacrylate) and poly(ethylene glycol diacylate)", Journal of Power Sources, 2003, 221-224, V. 124.
Chinese Office Action Issued Chinese Patent Application No. CN 2005800006276, dated Jul. 13, 2007.

*Primary Examiner*—Patrick Ryan
*Assistant Examiner*—Ben Lewis
(74) *Attorney, Agent, or Firm*—McDermott Will & Emery LLP

(57) ABSTRACT

A non-aqueous electrolyte secondary battery including: a positive electrode; a negative electrode; a separator interposed between the positive electrode and the negative electrode; a non-aqueous electrolyte; and a porous insulating film adhered to a surface of at least one selected from the group consisting of the positive electrode and the negative electrode, the porous insulating film including an inorganic oxide filler and a film binder, wherein the ratio R of actual volume to apparent volume of the separator is not less than 0.4 and not greater than 0.7, and wherein the ratio R and a porosity P of the porous insulating film satisfy the relational formula: $-0.10 \leqq R-P \leqq 0.30$.

2 Claims, 3 Drawing Sheets

U.S. PATENT DOCUMENTS

| | | |
|---|---|---|
| 5,342,709 A | 8/1994 | Yahnke et al. |
| 5,597,512 A | 1/1997 | Watanabe et al. |
| 5,705,292 A * | 1/1998 | Yukita et al. ............... 429/137 |
| 5,948,464 A | 9/1999 | Delnick |
| 5,965,299 A | 10/1999 | Khan et al. |
| 6,053,953 A | 4/2000 | Tomiyama et al. |
| 6,084,767 A | 7/2000 | Day et al. |
| 6,110,619 A | 8/2000 | Zhang et al. |
| 6,287,720 B1 | 9/2001 | Yamashita et al. |
| 6,296,969 B1 | 10/2001 | Yano et al. |
| 6,365,300 B1 * | 4/2002 | Ota et al. ................. 429/304 |
| 6,395,423 B1 * | 5/2002 | Kawakami et al. ......... 429/215 |
| 6,636,988 B1 | 10/2003 | Firley et al. |
| 2001/0009736 A1 | 7/2001 | Shlota et al. |
| 2002/0034685 A1 | 3/2002 | Sato et al. |
| 2002/0055036 A1 * | 5/2002 | Shinohara et al. ............ 429/62 |
| 2002/0102456 A1 | 8/2002 | Alhara et al. |
| 2002/0146626 A1 | 10/2002 | Komatsu et al. |
| 2003/0152828 A1 * | 8/2003 | Sun ............................ 429/142 |
| 2004/0101763 A1 * | 5/2004 | Kotato et al. ............... 429/331 |
| 2005/0214637 A1 | 9/2005 | Imachi et al. |
| 2006/0188785 A1 | 8/2006 | Inoue et al. |
| 2007/0042270 A1 | 2/2007 | Ohata et al. |

FOREIGN PATENT DOCUMENTS

| | | | |
|---|---|---|---|
| JP | 7-220759 A | 8/1995 | |
| JP | 09-147916 | * 11/1995 | ................ 429/246 |
| JP | 9-147916 A | 6/1997 | |
| JP | 10-214611 A | 8/1998 | |
| JP | 11-144706 A | 5/1999 | |
| JP | 2001-319634 A | 11/2001 | |
| JP | 2002-008730 A | 1/2002 | |
| JP | 2004-010701 | * 6/2002 | ................ 429/246 |
| JP | 2003-282148 A | 10/2003 | |
| JP | 2003-297429 A | 10/2003 | |
| WO | WO99/26307 A1 | 5/1999 | |
| WO | WO 99/363981 A1 | 7/1999 | |
| WO | WO 01/95421 A1 | 12/2001 | |

* cited by examiner

NONAQUEOUS ELECTROLYTE SECONDARY BATTERY

RELATED APPLICATION

This application is the U.S. National Phase under 35 U.S.C. § 371 of International Application No. PCT/JP2005/005158, filed on Mar. 22, 2005, which in turn claims the benefit of Japanese Application No. 2004-098985 filed on Mar. 30, 2004, Japanese Application No. 2004-173734 filed on Jun. 11, 2004, and Japanese Application No. 2004-183948 filed on Jun. 22, 2004, the disclosure of which Applications are incorporated by reference herein.

TECHNICAL FIELD

The present invention relates to a non-aqueous electrolyte secondary battery, and more particularly to a lithium ion secondary battery comprising a porous insulating film adhered to an electrode surface and having excellent thermal resistance, safety against short-circuit and discharge characteristic.

BACKGROUND ART

Since lithium ion secondary batteries have a high electromotive force and high energy density, they are employed as main power sources for mobile communication devices and portable electronic devices. A typical lithium ion secondary battery comprises a positive electrode composed of a lithium composite oxide, a negative electrode composed of a material capable of absorbing and desorbing lithium ions, a separator interposed between the positive electrode and the negative electrode, and a non-aqueous electrolyte.

Separators serve to electronically insulate the positive electrode and the negative electrode from each other as well as to retain a non-aqueous electrolyte. A separator is typically produced by molding a polyolefin resin or the like into a sheet form. Separators usually deform at a temperature of 120° C. to 160° C. For this reason, when a sharp projection such as a nail penetrates a separator (e.g., as in the nail penetration test), the separator deforms around the projection due to heat that is instantly generated by short-circuiting, thereby enlarging the short-circuited area. As a result, the battery might reach an overheated state.

In order to cope with the problem, it has been proposed to adhere a film containing an inorganic oxide such as alumina and a binder on the surface of either positive electrode or negative electrode (see Japanese Laid-Open Patent Publication No. Hei 7-220759). However, when a film is adhered to the electrode surface, discharge characteristic of the battery, namely, discharge characteristic in a low temperature environment or during large current discharge might be deteriorated significantly.

Also, a technique is proposed to enhance the shut-down effect of a film in the event of internal short-circuit by forming the film composed of a resin material having a high bulk density on an electrode (see Japanese Laid-Open Patent Publication No. Hei 11-144706). The effect of inhibiting ion migration obtained by allowing the resin forming a separator or film to soften and closing the pore structure is called shut-down effect.

In order to allow such a film to exhibit its shut-down effect in the event of internal short-circuit, it is necessary to set the glass transition temperature of the resin material at a low level. During the nail penetration test, however, the short-circuited area could locally have a temperature of over several hundred degrees although the temperature may vary depending on the test conditions. Accordingly, there is a possibility that the resin having a low glass transition temperature might be excessively softened or burned out, and the short-circuited area might be enlarged.

Proposals are also made from the viewpoint of preventing an internal short-circuit due to the asperity of electrode surface, one of which is a technique to form a film composed of an inorganic oxide filler such as alumina and a water soluble polymer on an electrode (see Japanese Laid-Open Patent Publication No. Hei 9-147916). The use of a film composed of an inorganic oxide filler having superior thermal resistance and a water soluble polymer prevents the film from deforming in the event of internal short-circuit.

However, polymers often swell by absorbing a liquid component for dispersing the raw material of the film during the formation of the film or absorbing an electrolyte during charge/discharge. If the film swells, the number of ion migration paths is decreased, resulting in low ion conductivity between the electrode plates, which makes it difficult to maintain discharge characteristic of the battery. Therefore, unless something is done to prevent the swelling of the film, even if improved safety against short-circuit is achieved, it is difficult to keep discharge characteristic of the battery.

Meanwhile, from the viewpoint of preventing dendrites, a technique is proposed in which a separator composed of a polymer layer having a porous structure and a ceramic composite layer containing inorganic particles is used (see Japanese Laid-Open Patent Publication No. 2001-319634). Further, in the event of lacking an electrolyte between the positive and negative electrodes due to the swelling of the electrodes, from the viewpoint of supplying an electrolyte to between the electrodes, a technique is proposed in which an electrolyte-retaining layer including inorganic particles dispersed therein is formed on the side of a separator in contact with a negative electrode (Japanese Laid-Open Patent Publication No. 2002-8730).

The foregoing improvement techniques (e.g., Japanese Laid-Open Patent Publications Nos. 2001-319634 and 2002-8730) are intended to prevent dendrites or to improve high rate discharge characteristic, and they do not deal with safety against internal short-circuit and safety at the time of nail penetration test. The ceramic composite layer is a part of the separator and the electrolyte-retaining layer is integrated with the separator. Accordingly, in the event of internal short-circuit, the ceramic composite layer and the electrolyte-retaining layer will also deform due to heat generated from the short circuit reaction.

DISCLOSURE OF INVENTION

An object of the present invention is to provide a non-aqueous electrolyte secondary battery comprising a porous insulating film adhered to an electrode surface which can prevent the deterioration of discharge characteristic particularly during low temperature discharge or during large current discharge and can provide excellent safety. Another object of the present invention is to provide a non-aqueous electrolyte secondary battery comprising a porous insulating film adhered to an electrode surface which can provide excellent thermal resistance, great safety against short-circuit and superior discharge characteristic by relieving the effect resulting from the swelling of the porous insulating film. Yet another object of the present invention is to provide a non-aqueous electrolyte secondary battery comprising a porous insulating film adhered to an electrode surface which can provide excellent thermal resistance, great safety against short-circuit and superior discharge characteristic by improving the adhering interface between the porous insulating film and the electrode surface.

Having conducted extensive studies, the present inventors have revealed that, although discharge characteristic can be improved by increasing the porosities of a porous insulating film and a separator, excessively increased porosities of a porous insulating film and a separator cause some drawbacks. More specifically, it was revealed that the shut-down characteristics of the porous insulating film and the separator decreases, and electric current continuously flows with low resistance even after shut-down, which increases the battery temperature. As a result, the present inventors have discovered that both a high level of safety and satisfactory discharge characteristic can be achieved by optimally designing the porosities of a porous insulating film and a separator.

Based on the above findings, the present invention has been accomplished. A first embodiment of the present invention relates to a non-aqueous electrolyte secondary battery comprising: a positive electrode; a negative electrode; a separator interposed between the positive electrode and the negative electrode; a non-aqueous electrolyte; and a porous insulating film adhered to a surface of at least one selected from the group consisting of the positive electrode and the negative electrode, wherein the ratio R of actual volume to apparent volume of the separator is not less than 0.4 and not greater than 0.7, and wherein the ratio R and a porosity P of the porous insulating film satisfy the relational formula:

$-0.10 \leq R-P \leq 0.30$.

The porous insulating film comprises an inorganic oxide filler and a film binder.

Preferably, 90% cumulative volume pore size D90 in a pore size distribution of the porous insulating film measured by a mercury intrusion porosimeter is not less than 0.15 μm.

Preferably, a void capable of retaining the non-aqueous electrolyte is formed on an adhering interface where the porous insulating film adheres to the electrode surface. In this case, a void size distribution of the adhering interface measured by a mercury intrusion porosimeter preferably has a peak in a region ranging from 1 to 4 μm. The electrode surface to which the porous insulating film adheres preferably has an average surface roughness Ra of 0.1 to 1 μm. Further, the rate of the void volume on the adhering interface to the total volume of pores of the porous insulating film is preferably 15 to 25%.

The inorganic oxide filler preferably comprises polycrystalline particles. Preferably, the polycrystalline particles each comprise a plurality of primary particles that are diffusion-bonded together. The primary particles forming the polycrystalline particles preferably have an average particle size of not greater than 3 μm, more preferably not greater than 1 μm. The average particle size of the polycrystalline particles is not less than twice the average particle size of the primary particles forming the polycrystalline particles, and not greater than 10 μm, more preferably not greater than 3 μm. More preferably, the primary particles have an average particle size of not greater than 1 μm, and the polycrystalline particles have an average particle size of not greater than 3 μm.

The amount of the film binder contained in the porous insulating film is preferably not greater than 4 parts by weight per 100 parts by weight of the inorganic oxide filler. Further, the amount of the film binder contained in the porous insulating film is preferably not less than 1 part by weight per 100 parts by weight of the inorganic oxide filler.

According to the present invention, it is possible to provide a non-aqueous electrolyte secondary battery comprising a porous insulating film adhered to an electrode surface which can prevent the deterioration of discharge characteristic of the battery and provide excellent shut-down effect. At the same time, safety against short-circuit can be ensured. More specifically, the shut-down effect, which increases resistance whenever necessary so as to shut down electric current, can also be enhanced while the discharge characteristic of the battery is maintained at a satisfactory level when the ratio R of actual volume to apparent volume of the separator is not less than 0.4 and not greater than 0.7, and the ratio R and a porosity P of the porous insulating film satisfy the relational formula:

$-0.10 \leq R-P \leq 0.30$.

When $0.4 \leq R \leq 0.7$ and $-0.10 \leq R-P \leq 0.30$ are satisfied, two effects are believed to contribute to the increase of internal resistance: the effect of inhibiting ion migration which is brought about by closing the pore structure; and the effect of inhibiting ion migration which is brought about by intrusion of resin into the voids of a surface portion of the porous insulating film so as to fill the voids with the resin. The former effect is exerted in the entire separator. The latter effect is exerted near the interface between the porous insulating film and the separator. The former effect, however, may not be obtained when the separator is thin because, in a thin separator, the constituent resin mostly melts and enters the voids of the electrode. The latter effect, on the other hand, can be obtained regardless of the thickness of the separator.

When 90% cumulative volume pore size D90 in a pore size distribution of the porous insulating film measured by a mercury intrusion porosimeter is not less than 0.15 μm, even if the film binder swells with the non-aqueous electrolyte, sufficient ion conductivity can be maintained because it is not largely affected by the swelling. In order to optimize the pore size distribution of the porous insulating film, it is preferred that the inorganic oxide filler comprise polycrystalline particles and the polycrystalline particles each comprise a plurality of primary particles that are diffusion-bonded together.

Moreover, when a void capable of retaining a non-aqueous electrolyte is formed at the adhering interface between the porous insulating film and an electrode surface, the ion conductivity of the electrode carrying the porous insulating film thereon can be maintained at a satisfactory level. Accordingly, the discharge characteristic is also maintained at a satisfactory level.

BEST MODE FOR CARRYING OUT THE INVENTION

A non-aqueous electrolyte secondary battery of the present invention includes a positive electrode; a negative electrode; a separator interposed between the positive electrode and the negative electrode; a non-aqueous electrolyte; and a porous insulating film adhered to a surface of at least one selected from the group consisting of the positive electrode and the negative electrode. The separator and the porous insulating film have common functions: both serve to electronically insulate the positive electrode and the negative electrode from each other, and to retain the non-aqueous electrolyte, but they differ significantly in structure.

Figure 1:
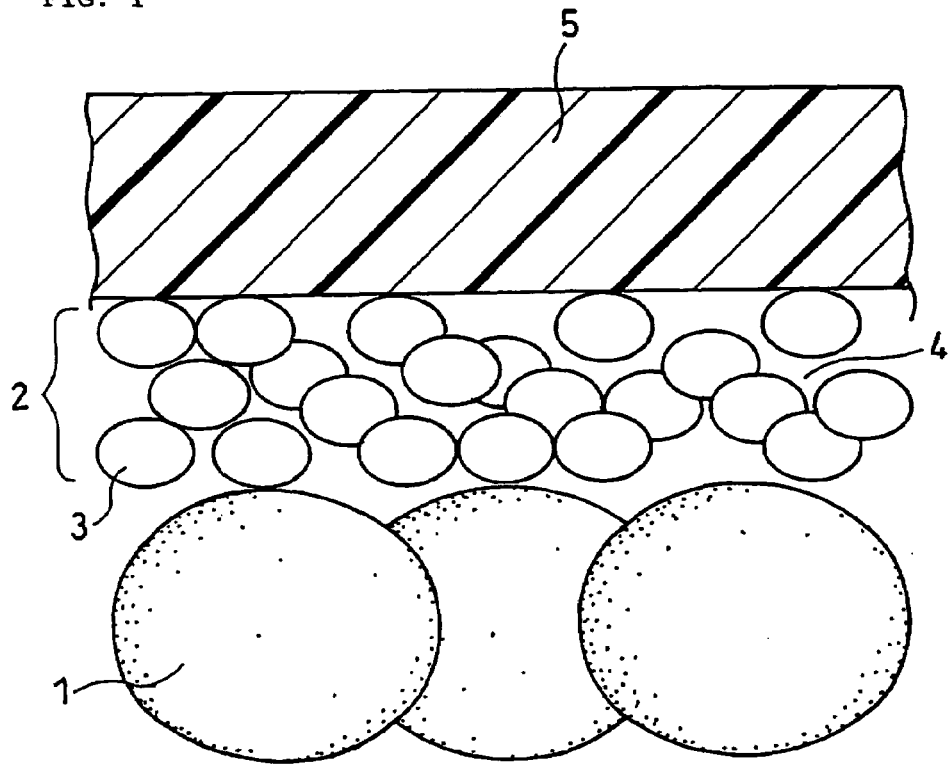
FIG. 1 is a schematic diagram showing a separator and a porous insulating film in the normal state.

FIG. 1 schematically shows a separator and a porous insulating film in the normal state. A porous insulating film 2 has a structure in which inorganic oxide filler particles 3 are bonded by a film binder (not shown in the diagram). Voids 4 are formed among the inorganic oxide filler particles. Because a non-aqueous electrolyte infiltrates into the voids 4, the ions in the electrolyte can easily pass through the porous insulating film 2. The ions having passed through the porous insulating film 2 reach active material particles 1 forming an electrode, and the electrode reaction proceeds.

A separator 5 is usually produced by drawing a resin sheet obtained by a molding method such as extrusion molding. The pore structure of the separator 5 is in the form of a matrix. Accordingly, the separator 5 has a high tensile strength in the plane direction and is liable to deform when exposed at a high temperature. The porous insulating film 2, on the other hand, has a lower tensile strength in the plane direction than the separator, but it is superior to the separator in that, unlike the separator 5, the porous insulating film does not deform even when exposed to a high temperature. Thus, the porous insulating film 2 mainly has the function to prevent a short circuit from spreading out in the event of the occurrence of internal short-circuit. Because the inorganic oxide filler has high thermal resistance, even when a short-circuited area is formed during, for example, the nail penetration test, it is possible to prevent the short-circuited area from enlarging by reaction heat.

Figure 2:
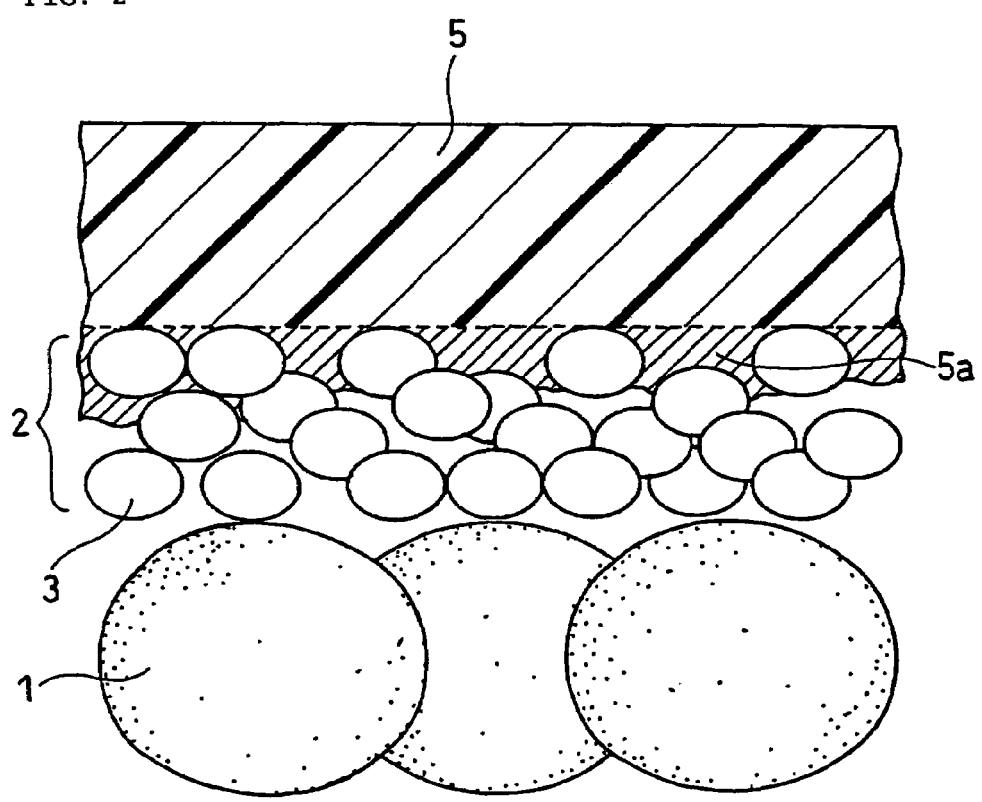
FIG. 2 is a schematic diagram showing a separator and a porous insulating film in a state at high temperature.

When the battery temperature is increased by an external factor and reaches the melting point of the separator 5, the pores of the separator close and the internal resistance of the battery increases. In such a case, as shown in FIG. 2, some of the melt resin 5a infiltrates into the voids 4 in the surface portion of the porous insulating film 2. As more voids 4 are filled with the infiltrated resin 5a, the internal resistance of the battery increases, which inhibits ion migration. It is therefore possible to shut down electric current effectively. The degree of the infiltration of the resin 5a is affected by the density of resin in the separator or the porosity of the porous insulating film 2. In other words, the shut-down effect can be enhanced by optimizing the relation between the ratio R of actual volume to apparent volume of the separator and a porosity P of the porous insulating film.

In order to improve the shut-down effect, the ratio R of actual volume to apparent volume of the separator should be not less than 0.4 and not greater than 0.7. Further, the ratio R and the porosity P of the porous insulating film must satisfy the relational formula: $-0.10 \leq R-P \leq 0.30$. When the ratio R is less than 0.4, the shut-down characteristic will be low. When the ratio R exceeds 0.7, the discharge characteristic will be low. Moreover, when the R–P is less than –0.10, although the separator melts, the voids of the surface portion of the porous insulating film will not be sufficiently filled with the resin, and the shut-down effect will be low. Conversely, when the R–P exceeds 0.30, the discharge characteristic of the battery during low temperature discharge or during large current discharge will be low.

A porosity P of the porous insulating film should be determined so as to satisfy the range: $-0.10 \leq R-P \leq 0.30$. The porosity P of the porous insulating film can be determined by the following method. A paint (hereinafter referred to as porous film paint) is first prepared, the paint containing an inorganic oxide filler, a film binder and a dispersing medium for dispersing the filler. The porous film paint is applied onto a metal foil and dried. The dried film attached to the metal foil is cut into a desired area, from which the metal foil is removed. Thereby, a sample of the porous insulating film is obtained. From the thickness and area of the obtained sample, the apparent volume $V_a$ of the porous insulating film is determined. Subsequently, the weight of the sample is measured. Using the weight of the sample and the actual specific gravity of the inorganic filler and the film binder, the actual volume $V_t$ of the porous insulating film is determined. From the apparent volume $V_a$ and the actual volume $V_t$, the porosity P is calculated by the following equation:

$$\text{porosity } P=(V_a-V_t)/V_a.$$

The ratio R of actual volume to apparent volume of the separator can be determined by the following method. The apparent volume $V_{as}$ of the separator is first calculated from the thickness and area of the separator. Subsequently, the weight of the separator is measured. Using the weight and actual specific gravity of the separator, the actual volume $V_{ts}$ of the separator is determined. From the apparent volume $V_{as}$ and the actual volume $V_{ts}$, the ratio R is calculated by the following equation: ratio $R=V_{ts}/V_{as}$.

Although the material for the separator is not specifically limited, the separator is preferably composed mainly of a resin material having a melting point of not greater than 200° C. Namely, a polyolefin is preferably used. Particularly preferred are polyethylene, polypropylene, ethylene-propylene copolymers and composites of polyethylene and polypropylene. This is because a separator made of a polyolefin having a melting point of not greater than 200° C. melts easily in the event where the battery is short-circuited by an external factor. The separator may be a single-layer film composed of a single polyolefin resin, or a multilayer film composed of two or more polyolefin resins. Although not specifically limited, the thickness of the separator is preferably 8 to 30 μm from the viewpoint of maintaining the design capacity of the battery.

The porous insulating film should be adhered to an electrode surface. This is because, if the porous insulating film is adhered onto a separator having low thermal resistance, when the separator deforms at a high temperature, the porous insulating film also deform. Also, it is not practical to form a sheet composed of the porous insulating film alone and to dispose the sheet between positive and negative electrodes, either. In the case of forming a sheet composed of the porous insulating film alone, the thickness of the sheet needs to be increased to a considerably large thickness from the viewpoint of retaining the strength. In addition, it requires a large amount of film binder. The use of such a porous insulating film makes it difficult to maintain battery characteristics and design capacity.

The present invention encompasses all cases where the porous insulating film is placed between positive and negative electrodes. In other words, the present invention includes the following cases: the case where the porous insulating film is adhered to only positive electrode surface; the case where the porous insulating film is adhered to only negative electrode surface; and the case where the porous insulating films are adhered to both positive electrode surface and negative electrode surface, respectively. The present invention further includes the following cases: the case where the porous insulating film is adhered to only one surface of the positive electrode; the case where the porous insulating film is adhered to both surfaces of the positive electrode, respectively; the case where the porous insulating film is adhered to only one surface of the negative electrode; and the case where the porous insulating films are adhered to both surfaces of the negative electrode, respectively.

From the viewpoint of providing a porous insulating film having high thermal resistance, it is desirable that the inorganic oxide filler have a thermal resistance of not less than 250° C., and that the inorganic oxide filler be electrochemically stable in the potential window of non-aqueous electrolyte secondary batteries. Although many inorganic oxide fillers satisfy these conditions, among inorganic oxides, preferred are alumina, silica, zirconia, titania. Particularly preferred are alumina and titania. The inorganic oxide fillers may be used singly or in any combination of two or more.

From the viewpoint of providing a porous insulating film having satisfactory ion conductivity, the inorganic oxide filler preferably has a bulk density (tap density) of not less than 0.2 $g/cm^3$ and not greater than 0.8 $g/cm^3$. When the bulk density is less than 0.2 $g/cm^3$, the inorganic oxide filler will be too bulky, and the structure of the porous insulating film might be brittle. Conversely, when the bulk density exceeds 0.8 $g/cm^3$, it might be difficult to form suitable voids among the filler particles. The particle size of the inorganic oxide filler is not specifically limited, but the smaller the particle size, the lower the bulk density tends to be. Although the particle shape of the inorganic oxide filler is not specifically limited, it is desirably an indefinite-shaped particle comprising a plurality (e.g., about 2 to 10, preferably 3 to 5) of primary particles bonded together. Since primary particles usually consist of a single crystal, the indefinite-shaped particle is always a polycrystalline particle.

The amount of the film binder contained in the porous insulating film is desirably not less than 1 part by weight and not greater than 20 parts by weight relative to 100 parts by weight of the inorganic oxide filler, more desirably, not less than 1 part by weight and not greater than 5 parts by weight. When the amount of the film binder exceeds 20 parts by weight, many of the pores in the porous insulating film will be filled with the film binder, and the discharge characteristic might be low. Conversely, when the amount of the film binder is less than 1 part by weight, the adhesion between the porous insulating film and an electrode surface will be low, and the porous insulating film might be separated from the electrode surface.

From the viewpoint of maintaining thermal stability of the porous insulating film even when an area in which an internal short-circuit has occurred is heated to a high temperature, the film binder preferably has a melting point or thermal decomposition temperature of not less than 250° C. Further, when the film binder is composed of a crystalline polymer, the crystalline polymer preferably has a melting point of not less than 250° C. It should be understood that because the porous insulating film is composed mainly of an inorganic oxide having high thermal resistance, the effect of the present invention is not largely affected by the thermal resistance of the film binder.

Examples of the film binder include styrene butadiene rubber (SBR), modified forms of SBR containing an acrylic acid unit or acrylate unit, polyethylene, polytetrafluoroethylene (PTFE), polyvinylidene fluoride (PVDF), tetrafluoroethylene-hexafluoropropylene copolymers (FEP), derivatives of polyacrylic acid and derivatives of polyacrylonitrile. They may be used singly or in any combination of two or more. Among them, particularly preferred are derivatives of polyacrylic acid and derivatives of polyacrylonitrile. Preferably, these derivatives further contain, in addition to an acrylic acid unit or/and an acrylonitrile unit, at least one selected from the group consisting of methyl acrylate unit, ethyl acrylate unit, methyl methacrylate unit and ethyl methacrylate unit.

When rubber particles (e.g., SBR or its derivative) are used as the film binder, the film binder preferably further contains a thickener. As the thickener, it is generally best to select a polymer soluble in a dispersing medium for the porous film paint. Examples of such thickener include PVDF and carboxymethyl cellulose (CMC). Also, modified acrylonitrile rubber soluble in the dispersing medium may be used.

From the viewpoint of preventing the decrease of discharge performance due to the swelling of the porous insulating film, desirably, 90% cumulative volume pore size D90 in a pore size distribution of the porous insulating film measured by a mercury intrusion porosimeter is not less than 0.15 μm. The pore size distribution indicates, for example, the relation between pore size and volume (frequency) of the pores having the pore size. Cumulative volume is calculated by adding up the volume of pores from pores having a smaller pore size.

When the pore size D90 is not less than 0.15 μm, even if the film binder in the porous insulating film is swelled with the non-aqueous electrolyte, it is believed that the pores necessary to ensure ion conductivity will remain in the porous insulating film. When the pore size D90 is less than 0.15 μm, the small pores will account for an excessively large proportion of the total pores in the porous insulating film, and the porous insulating film will be easily affected by the swelling of the film binder. From the viewpoint of further reducing the effect due to the swelling of the film binder, the pore size D90 is preferably not less than 0.2 μm. When the pore size D90 is too large, however, the volume ratio of the pores in the porous insulating film will be excess, and the structure of the porous insulating film will be brittle. Accordingly, the pore size D90 is desirably not greater than 2 μm.

From the viewpoint of achieving the pore size distribution as described above, the amount of the film binder contained in the porous insulating film is desirably not greater than 4 parts by weight per 100 parts by weight of the inorganic oxide filler, more preferably, not greater than 3 parts by weight. The amount of the film binder disposed among the inorganic oxide filler particles should be small: otherwise, it is difficult to form a porous-insulating film having a pore size D90 of not less than 0.15 μm. By reducing the amount of the film binder disposed among the inorganic oxide filler particles to a small level, the swelling of the porous insulating film can be prevented effectively. On the other hand, from the viewpoint of preventing the porous insulating film from separating or dropping from an electrode surface, the amount of the film binder is preferably not less than 1 part by weight per 100 parts by weight of the inorganic oxide filler.

From the viewpoint of achieving the pore size distribution as described above, the inorganic oxide filler preferably contain polycrystalline particles having a shape such as dendritic, coral-like or grape bunch-like. Because such polycrystalline particles hardly form an excessively close-packed structure in the porous insulating film, they are suitable for forming appropriate voids. Examples of the polycrystalline particles include particles each comprising about 2 to 10 primary particles bonded together by melting and particles each comprising about 2 to 10 crystals coalesced by contacting with each other during the growth of the crystal.

The primary particles forming the polycrystalline particles desirably have an average particle size of not greater than 3 μm, more preferably not greater than 1 μm. When the primary particles have an average particle size of exceeding 3 μm, the amount of the film binder will be excess as the surface area of the filler is decreased, and the swelling of the porous insulating film due to the non-aqueous electrolyte might easily occur. In the case where the primary particles cannot be identified clearly in the polycrystalline particles, the particle size of the primary particles is defined by the thickest part of a knot of the individual polycrystalline particles.

The average particle size of the primary particles can be determined by, for example, measuring the particle size of at least 10 primary particles using an SEM image or TEM image of the polycrystalline particles, and then calculating the average thereof. When the primary particles are heated to be diffusion-bonded to produce polycrystalline particles, the average particle size (volume based median size: D50) of the primary particles serving as the raw material can be treated as the average particle size of the primary particles forming the polycrystalline particles. In the heat treatment only to facilitate the diffusion and bonding, the average particle size of the primary particles hardly changes.

The average particle size of the polycrystalline particles is desirably not less than twice the average particle size of the primary particles, and not greater than 10 μm, more desirably not greater than 3 pμm. The average particle size (volume based median size: D50) of the polycrystalline particles can be measured by, for example, a wet type laser particle size distribution analyzer available from Microtrac Inc. When the polycrystalline particles have an average particle size less than twice that of the primary particles, the porous insulating film might have an excessively close-packed structure. When the polycrystalline particles have an average particle size of exceeding 10 μm, the porosity of the porous insulating film might be excess, and the structure of the porous insulating film might be brittle.

The method for obtaining the polycrystalline particles is not specifically limited. For example, they can be obtained by baking an inorganic oxide to form a mass and pulverizing the mass into an appropriate size. Alternatively, without performing the pulverization step, polycrystalline particles can be directly obtained by allowing growing crystals to contact with each other.

For example, when the polycrystalline particles are obtained by baking α-alumina to form a mass, which is then pulverized into an appropriate size, the baking temperature is preferably 800 to 1300° C. The baking time is preferably 3 to 30 minutes. The pulverization of the mass can be done by a wet type grinding unit such as ball mill or a dry type grinding unit such as jet mill or jaw crusher. In this case, those skilled in the art can obtain polycrystalline particles having a desired average particle size by appropriately adjusting the pulverization conditions.

The porous insulating film adhered to an electrode surface is obtained by first preparing a paint (hereinafter referred to as porous film paint) containing an inorganic oxide filler and a film binder, which is then applied onto an electrode surface, followed by drying. The porous film paint is obtained by mixing an inorganic oxide filler and a film binder with a dispersing medium for the filler. Preferred examples of the dispersing medium include, but not limited to, organic solvents such as N-methyl-2-pyrrolidone (NMP) and cyclohexanone, and water. The mixture of the filler, the film binder and the dispersing medium can be performed by using a double arm kneader such as planetary mixer or a wet type disperser such as beads mill. The application of the porous film paint on an electrode surface can be done by comma roll method, gravure roll method or die coating method.

It is generally accepted that, when the degree of dispersion of the porous film paint is increased, the film binder covers the inorganic oxide filler more completely, thereby improving the binding capability. On the other hand, when the degree of dispersion of the porous film paint is increased, the pore size of the porous insulating film tends to be small. Conversely, when the degree of dispersion of the porous film paint is decreased, the binding capability tends to be low. Further, when the degree of dispersion of the porous film paint is decreased, because the film binder aggregates, the pore size of the porous insulating film tends to be large. Accordingly, in order to allow the porous insulating film to exhibit sufficient binding capability while the pore size D90 is not less than 0.15 mm, it is desirable to appropriately select the dispersion conditions of the porous film paint.

Those skilled in the art can appropriately select the dispersion conditions of the porous film paint according to the intended final condition of the paint. Because the state of dispersion of the porous film paint varies according to, for example, the mechanism, performance capability and operation conditions of the equipment used for the preparation of the porous film paint, the state of dispersion can be readily controlled by appropriately selecting them. For example, the state of dispersion of the porous film paint varies between when the equipment is a double arm kneader and when the equipment is a beads mill. Further, the state of dispersion of the porous film paint varies also according to the performance capability of the equipment such as the size or rotation speed of dispersing machine, the amount of raw material for the paint introduced into the dispersing machine, the solid content of the paint, or the operation conditions such as stirring time.

From the viewpoint of controlling the degree to which the film binder covers the inorganic oxide filler, it is desirable to appropriately adjust the conditions for applying the porous film paint or the conditions for drying the film. Specifically, it is desirable to facilitate the aggregation of the film binder to an appropriate level by increasing the application speed or the volume of dry air.

The adhering interface between the porous insulating film and an electrode surface is described below in detail.

Desirably, voids capable of retaining a non-aqueous electrolyte are formed on the adhering interface between the porous insulating film and an electrode surface. Due to the retention of a non-aqueous electrolyte by these voids, satisfactory ion conductivity is ensured in an electrode to which the porous insulating film is adhered, and the battery can maintain satisfactory discharge characteristic.

In a conventional battery including no porous insulating film, voids capable of retaining a non-aqueous electrolyte exist between the asperity that is inevitably formed on an electrode surface and the separator. These voids are presumed to serve to impart satisfactory ion conductivity to the electrode which is adjacent to the separator. In order to adhere the porous insulating film to the electrode surface while retaining the voids derived from the asperity of such electrode surface and to maintain satisfactory ion conductivity in the electrode, the conditions for forming the porous insulating film on the electrode surface should be appropriately selected.

The conditions for forming the porous insulating film on the electrode surface can be appropriately adjusted by controlling the viscosity of the porous film paint or the conditions for drying the film of the porous film paint (e.g., temperature, volume of air, time). Those skilled in the art can control the above conditions such that predetermined voids are formed on the adhering interface between the porous insulating film and the electrode surface to which the porous insulating film is adhered.

From the viewpoint of ensuring the mass productivity of the battery, desirably, the void formed on the adhering interface between the porous insulating film and the electrode surface to which the porous insulating film is adhered has a size of 1 to 4 μm when measuring the size using a mercury intrusion porosimeter. This is because it is relatively easy to control the above conditions so as to form the void having the above size and because a void having a size of 1 to 4 μm sufficiently exhibits the function to retain a non-aqueous electrolyte.

In other words, the void size distribution of the adhering interface measured by a mercury intrusion porosimeter desirably has a peak in a region ranging from 1 to 4 μm. When the void size distribution has a peak at less than 1 μm, the size of the voids will be small, and their function to store a non-aqueous electrolyte tends to be low. Conversely, when the void size distribution has a peak at greater than 4 μm, the adhering area between the porous insulating film and the electrode surface will be small and the adhesion therebetween will be low. Accordingly, the possibility that the porous insulating film might be separated from the electrode surface increases.

In order to form a void having a size of 1 to 4 μm on the adhering interface, desirably, the surface roughness of the electrode surface to which the porous insulating film is adhered is appropriately adjusted. Specifically, the average value Ra of the surface roughness of the electrode surface measured by a surface roughness measuring instrument is desirably 0.1 to 1 μm, more desirably 0.2 to 0.8 μm. When the Ra is less than 0.1 μm, the electrode surface serving as the base for the porous insulating film will be excessively smooth, and it might be difficult to form a void having a size of 1 μm or greater on the adhering interface. Conversely, when the Ra exceeds 1 μm, the electrode surface serving as the base will be excessively nonuniform and the adhering area between the electrode surface and the porous insulating film will be excessively small, and it might be difficult to form a void having a size of 4 μm or less on the adhering interface.

The rate of the void volume on the adhering interface to the total volume of pores of the porous insulating film is preferably 15 to 25%. As used herein, the void volume on the adhering interface is a value measured by a mercury intrusion porosimeter, and the total volume of pores of the porous insulating film is also a value measured by a mercury intrusion porosimeter.

The porous insulating film preferably has a thickness of 2 to 10 μm regardless of the shape of the filler, more preferably 3 to 7 μm. When the porous insulating film has a thickness of 2 to 10 μm, particularly satisfactory balance of improved safety by the porous insulating film and energy density of the battery can be maintained. When the porous insulating film has a thickness of less than 2 μm, the thermal resistance of the porous insulating film will be low. Conversely, when the porous insulating film has a thickness of exceeding 10 μm, the volume of an electrode group composed of electrode plates, the porous insulating film and a separator will increase, and the energy density of the battery will be low.

The negative electrode is formed by placing, on a negative electrode current collector, a material mixture layer containing: a negative electrode active material composed of at least a material capable of absorbing and desorbing lithium ions; a negative electrode binder; and a thickener. Examples of the negative electrode active material include, but not limited to, carbon materials such as any natural graphite, any artificial graphite, petroleum coke, carbon fiber and a baked organic polymer, oxides, a silicon or tin-containing composite material such as siliside, a silicon-containing composite material, any metal material and any alloy material. They may be used singly or in any combination of two or more.

Although not specifically limited, the negative electrode binder is preferably rubber particles because even a small amount thereof is sufficient to provide the binding capability. Particularly, those containing a styrene unit and a butadiene unit are preferred. Examples include styrene-butadiene copolymer (SBR) and a modified form of SBR containing an acrylic acid unit or acrylate unit. They may be used singly or in any combination of two or more.

When rubber particles are used as the negative electrode binder, a thickener composed of a water soluble polymer is preferably used with the rubber particles. The water soluble polymer is preferably a cellulose resin, more preferably CMC. The amounts of the rubber particles and the thickener contained in the negative electrode are preferably 0.1 to 5 parts by weight per 100 parts by weight of the negative electrode active material, respectively. As the negative electrode binder, other than those mentioned above, PVDF or a modified form of PVDF may be used.

As the negative electrode current collector, a metal foil stable under a negative electrode potential such as a copper foil, or a film having a metal (e.g., copper) disposed on the surface thereof can be used. The surface of the negative electrode current collector may be roughened to form recesses and projections or the current collector may be punched.

The positive electrode is formed by placing, on a positive electrode current collector, a material mixture layer containing: a positive electrode active material composed of at least a lithium composite oxide; a positive electrode binder; and a conductive material. Examples of the lithium composite oxide include, but not limited to, lithium cobalt oxide ($LiCoO_2$), modified forms of lithium cobalt oxide, lithium nickel oxide ($LiNiO_2$), modified forms of lithium nickel oxide, lithium manganese oxide ($LiMn_2O_2$), modified forms of lithium manganese oxide, any of the above-listed oxides in which Co, Ni or Mn is partially replaced with other transition metal element, or with a typical metal such as aluminum or magnesium; and a compound containing iron as the main constituent element which is referred to as olivinic acid. They may be used singly or in any combination of two or more.

The positive electrode binder is not specifically limited. Examples include polytetrafluoroethylene (PTFE), modified forms of PTFE, PVDF, modified forms of PVDF, and modified acrylonitrile rubber particles. They may be used singly or in any combination of two or more. Preferably, PTFE is used with a thickener. As the thickener, preferred are CMC, polyethylene oxide (PEO), and modified acrylonitrile rubber (e.g. BM-720H (trade name) available from ZEON CORPORATION).

As the conductive material, acetylene black, ketjen black or any graphite can be used. They may be used singly or in any combination of two or more.

As the positive electrode current collector, a metal foil stable under a positive electrode potential such as an aluminum foil, or a film having a metal (e.g., aluminum) disposed on the surface thereof can be used. The surface of the positive electrode current collector may be roughened to form recesses and projections or the current collector may be punched.

The non-aqueous electrolyte is preferably prepared by dissolving a lithium salt in a non-aqueous solvent. The concentration of the lithium salt dissolved in the non-aqueous solvent is usually 0.5 to 2 mol/L. As the lithium salt, preferably used are lithium hexafluorophosphate ($LiPF_6$), lithium perchlorate ($LiClO_4$) and lithium tetrafluoroborate ($LiBF_4$). They may be used singly or in any combination of two or more.

As the non-aqueous solvent, ethylene carbonate (EC), propylene carbonate (PC), dimethyl carbonate (DMC), diethyl carbonate (DEC) and ethyl methyl carbonate (EMC) are preferred for use. The non-aqueous solvents are preferably used in a combination of two or more.

In order to form a satisfactory film on an electrode so as to ensure stability during overcharge, it is preferred to add, to the non-aqueous electrolyte, vinylene carbonate (VC), cyclohexyl benzene (CHB), a modified form of VC or CHB or the like.

The present invention will be described in greater detail below with reference to examples, but it should be understood that the present invention is not limited to the examples given below.

EXAMPLE 1

(i) Production of Positive Electrode

A positive electrode material mixture paste was prepared by mixing with stirring 3 kg of lithium cobalt oxide (positive electrode active material), 1 kg of #1320 (trade name) available from Kureha Chemical Industry Co., Ltd. (an NMP solution containing 12% by weight PVDF (positive electrode binder)), 90 g of acetylene black (conductive material) and an appropriate amount of NMP with the use of a double arm kneader. This paste was applied onto both surfaces of a 15 μm thick aluminum foil (positive electrode current collector) except for the positive electrode lead connecting part. The dried coating layers were rolled by rollers to form positive electrode material mixture layers. Thereby, a positive electrode hoop was obtained. The electrode plate composed of the aluminum foil and the positive electrode material mixture layers had a thickness of 160 μm. Thereafter, the positive electrode hoop was cut into a size of 60 mm in width and 500 mm in length. A lead was connected thereto to obtain a positive electrode plate.

(ii) Production of Negative Electrode

A negative electrode material mixture paste was prepared by mixing with stirring 2 kg of artificial graphite (negative electrode active material), 75 g of BM-400B (trade name) available from ZEON CORPORATION (an aqueous dispersion containing 40% by weight modified form of styrene-butadiene copolymer (negative electrode binder)), 30 g of CMC (thickener) and an appropriate amount of water with the use of a double arm kneader. This paste was applied onto both surfaces of a 10 μm thick copper foil (negative electrode current collector) except for the negative electrode lead connecting part. The dried coating layers were rolled by rollers to form negative electrode material mixture layers. Thereby, a negative electrode hoop was obtained. The electrode plate composed of the copper foil and the negative electrode material mixture layers had a thickness of 180 μm.

(iii) Formation of Porous Insulating Film

A porous film paint was prepared by mixing with stirring 950 g of an inorganic oxide filler, 625 g of BM-720H (trade name) available from ZEON CORPORATION (a solution containing 12% by weight polyacrylonitrile derivative (film binder)) and an appropriate amount of NMP with the use of a double arm kneader. This paste was applied onto both surfaces of the negative electrode hoop, which was then dried to form porous insulating layers each having a thickness of 5 μm. Thereafter, the negative electrode hoop was cut into a size of 62 mm in width and 570 mm in length. A lead was connected thereto to obtain a negative electrode plate.

Seven different negative electrode plates having porous insulating layers with a porosity P of 0.30, 0.35, 0.40, 0.45, 0.55, 0.60 and 0.65 were produced by using, as the inorganic filler, alumina powders having a bulk density (tap density) of 0.08 g/cm$^3$, 0.2 g/cm$^3$, 0.6 g/cm$^3$, 0.9 g/cm$^3$, 1.2 g/cm$^3$, 1.5 g/cm$^3$ and 1.7 g/cm$^3$, respectively.

(iv) Production of Electrode Group

As the separator, six different polypropylene microporous films (film thickness: 16 μm) were used. These separators had a ratio R of actual volume to apparent volume of 0.40, 0.45, 0.55, 0.60, 0.65 and 0.70, respectively. The seven negative electrodes and the six separators obtained above were combined to form different combinations such that the R value of the separator and the P value of the porous insulating film satisfy $-0.10 \leq R-P \leq 0.30$ as listed in Table 1. Electrode groups were produced by spirally winding the positive electrode and each of the combinations of the negative electrode and the separator.

Each of the obtained electrode groups was inserted in a cylindrical battery case having a diameter of 18 mm and a height of 67 mm. Leads were connected to predetermined portions. An electrolyte was then injected therein in an amount of 5.5 g. The electrolyte was prepared by dissolving LiPF$_6$ in a solvent mixture comprising ethylene carbonate (EC) and ethyl methyl carbonate (EMC) at a volume ratio of 1:3 at a LiPF$_6$ concentration of 1 mol/L. Thereafter, the opening of the battery case was sealed with a sealing plate to produce a cylindrical battery having a design capacity of 2000 mAh and a size of 18 mm in diameter and 65 mm in height.

COMPARATIVE EXAMPLE 1

Five different negative electrode plates having porous insulating layers with a porosity P of 0.30, 0.35, 0.55, 0.60 and 0.65 were produced in the same manner as in Example 1 except that, as the inorganic oxide filler, alumina powders having a bulk density (tap density) of 0.08 g/cm$^3$, 0.2 g/cm$^3$, 0.6 g/cm$^3$, 1.5 g/cm$^3$ and 1.7 g/cm$^3$ were used, respectively. As the separator, four different polypropylene microporous films (thickness: 16 μm) having a ratio R of actual volume to apparent volume of 0.40, 0.45, 0.65 and 0.70 were used.

The five negative electrodes and the four separators obtained above were combined to form different combinations such that the R value of the separator and the P value of the porous insulating film satisfy $0.35 < R-P$ or $R-P < -0.15$ as listed in Table 1. Electrode groups with the combinations were produced in the same manner as in Example 1. Finally, cylindrical batteries were produced.

TABLE 1

| | | | | P | | | | |
|---|---|---|---|---|---|---|---|---|
| R-P | | 0.30 | 0.35 | 0.40 | 0.45 | 0.55 | 0.60 | 0.65 |
| R | 0.70 | 0.40* | 0.35* | 0.30 | 0.25 | 0.15 | 0.10 | 0.05 |
| | 0.65 | 0.35* | 0.30 | 0.25 | 0.20 | 0.10 | 0.05 | 0.00 |
| | 0.60 | 0.30 | 0.25 | 0.20 | 0.15 | 0.05 | 0.00 | −0.05 |
| | 0.55 | 0.25 | 0.20 | 0.15 | 0.10 | 0.00 | −0.05 | −0.10 |
| | 0.45 | 0.15 | 0.10 | 0.05 | 0.00 | −0.10 | −0.15* | −0.20* |
| | 0.40 | 0.10 | 0.05 | 0.00 | −0.05 | −0.15* | −0.20* | −0.25* |

The asterisks (*) indicate Comparative Example.

[Evaluation 1]

The batteries produced in Example 1 and Comparative Example 1 were subjected to the following evaluation tests.

(Low Temperature Discharge Test)

Each battery was charged at a constant voltage of 4.2 V with a maximum current of 1400 mA at an environmental temperature of 20° C. for 2 hours, and then discharged at a constant current of 2000 mA with an end-of-discharge voltage of 3.0 V at an environmental temperature of 20° C. The discharge capacity at 20° C. was measured. Subsequently, the battery having been discharged at 20° C. was again charged under the same conditions as above, after which the charged battery was cooled down at an environmental temperature of −10° C. for 6 hours. The battery having cooled down was discharged at a constant current of 2000 mA with an end-of-discharge voltage of 3.0 V at an environmental temperature of −10° C. Then, the discharge capacity at −10° C. was measured. The rate of the discharge capacity at −10° C. to the discharge capacity at 20° C. was calculated in percentage (%), which was referred to as low temperature discharge retention rate (−10° C./−20° C. discharge capacity ratio). The results are shown in Table 2.

(Shut-Down Test)

Each battery was charged at a constant voltage of 4.2 V with a maximum current of 1400 mA at an environmental temperature of 20° C. for 2 hours. Subsequently, the AC impedance of the battery in an open circuit condition was monitored while the temperature in the thermostatic chamber was increased. The internal resistance of the battery was measured when the battery shut down. The results are shown in Table 3.

TABLE 2

| −10° C./20° C. discharge capacity ratio | P | | | | | | |
|---|---|---|---|---|---|---|---|
| (%) | 0.30 | 0.35 | 0.40 | 0.45 | 0.55 | 0.60 | 0.65 |
| R   0.70 | 45 | 55 | 65 | 75 | 83 | 85 | 89 |
| 0.65 | 53 | 69 | 75 | 80 | 88 | 90 | 94 |
| 0.60 | 61 | 78 | 84 | 87 | 91 | 94 | 94 |
| 0.55 | 70 | 79 | 85 | 88 | 92 | 94 | 95 |
| 0.45 | 76 | 82 | 88 | 91 | 94 | 95 | 96 |
| 0.40 | 78 | 83 | 89 | 92 | 95 | 95 | 96 |

TABLE 3

| Internal resistance at the time of shut-down | P | | | | | | |
|---|---|---|---|---|---|---|---|
| (Ω) | 0.30 | 0.35 | 0.40 | 0.45 | 0.55 | 0.60 | 0.65 |
| R   0.70 | $10^{-5}$ | $10^{-5}$ | $10^{-5}$ | $10^{-5}$ | $10^{-5}$ | $10^{-5}$ | $10^{-5}$ |
| 0.65 | $10^{-5}$ | $10^{-5}$ | $10^{-5}$ | $10^{-5}$ | $10^{-5}$ | $10^{-5}$ | $10^{-5}$ |
| 0.60 | $10^{-5}$ | $10^{-5}$ | $10^{-5}$ | $10^{-5}$ | $10^{-5}$ | $10^{-5}$ | $10^{-5}$ |
| 0.55 | $10^{-5}$ | $10^{-5}$ | $10^{-5}$ | $10^{-5}$ | $10^{-5}$ | $10^{-5}$ | $10^{-5}$ |
| 0.45 | $10^{-5}$ | $10^{-5}$ | $10^{-5}$ | $10^{-5}$ | $10^{-5}$ | $10^{-3}$ | $10^{-3}$ |
| 0.40 | $10^{-5}$ | $10^{-5}$ | $10^{-5}$ | $10^{-5}$ | $10^{-3}$ | $10^{-3}$ | $10^{-2}$ |

As seen from Table 2, the batteries having an R−P value of 0.35 or more exhibited a significantly decreased low temperature discharge retention rate of not greater than 60%. This indicates that, in order to obtain batteries having excellent low temperature discharge characteristic, the batteries should be designed to satisfy R−P≦0.30. Likewise, as seen from Table 3, the batteries having an R−P value of −0.15 or less exhibited a low internal resistance of $10^{-3}$ Ω or less when the batteries shut down. In contrast, the batteries having an R−P value of −0.10 or greater achieved a high internal resistance of $10^{-5}$ Ω or higher, and satisfactory shut-down effect was obtained. The foregoing indicates that batteries having excellent low temperature discharge characteristic and satisfactory shut-down characteristic can be obtained by satisfying 0.4≦R≦0.7 and −0.10≦R−P0.30.

EXAMPLE 2

(i) Production of Positive Electrode

A positive electrode material mixture paste was prepared by mixing with stirring 3 kg of lithium cobalt oxide (positive electrode active material), 1 kg of #1320 (trade name) available from Kureha Chemical Industry Co., Ltd. (an NMP solution containing 12% by weight PVDF (positive electrode binder)), 90 g of acetylene black (conductive material) and an appropriate amount of NMP with the use of a double arm kneader. This paste was applied onto both surfaces of a 15 μm thick aluminum foil (positive electrode current collector) except for the positive electrode lead connecting part. The dried coating layers were rolled by rollers to form positive electrode material mixture layers. During the formation of the positive electrode material mixture layers, the thickness of the electrode plate composed of the aluminum foil and the positive electrode material mixture layers was controlled to be 160 μm. Then, the electrode plate was cut so as to have a width which would allow insertion thereof into a battery can for cylindrical battery (18650 type). Thereby, a positive electrode hoop was obtained.

(ii) Production of Negative Electrode

A negative electrode material mixture paste was prepared by mixing with stirring 2 kg of artificial graphite (negative electrode active material), 75 g of BM-400B (trade name) available from ZEON CORPORATION (an aqueous dispersion containing 40% by weight modified form of styrene-butadiene copolymer (negative electrode binder)), 30 g of CMC (thickener) and an appropriate amount of water with the use of a double arm kneader. This paste was applied onto both surfaces of a 10 μm thick copper foil (negative electrode current collector) except for the negative electrode lead connecting part. The dried coating layers were rolled by rollers to form negative electrode material mixture layers. During the formation of the negative electrode material mixture layers, the thickness of the electrode plate composed of the copper foil and the negative electrode material mixture layers was controlled to be 180 μm. Then, the electrode plate was cut so as to have a width which would allow insertion thereof into a battery can for cylindrical battery (18650 type). Thereby, a negative electrode hoop was obtained.

(iii) Formation of Porous Insulating Film

Alumina AA03 (trade name) available from Sumitomo Chemical Co., Ltd. (primary particles of α-alumina with a volume based median size: D50 of 0.3 μm) was heated at 900° C. for 1 hour so as to allow the primary particles to diffuse and bond together. Thereby, polycrystalline particles were obtained. The obtained polycrystalline particles had a volume based median size: D50 of 2.6 μm.

Three hundred grams of the obtained polycrystalline particles (inorganic oxide filler) and 12 g of solid content of BM720H (trade name) available from ZEON CORPORATION (a solution containing 12% by weight polyacrylonitrile derivative (film binder)) were mixed (i.e., 4 parts by weight film binder per 100 parts by weight polycrystalline particles) with stirring with an appropriate amount of NMP with the use of a double arm kneader having an internal volume of 300 ml (T.K.HIVIS MIX f model.1 available from Tokushu Kika Kogyo Co, Ltd), whereby first mixing was performed for 30 minutes with a solid content of 60% by weight. Thereafter, NMP was further added to the primary mixture, and second mixing was performed at a solid content of 30% by weight. Thereby, a porous film paint was prepared.

This paint was applied onto both surfaces of the negative electrode hoop by gravure roll method at a rate of 0.5 m/min., which was then dried by hot air blown at a rate of 0.5 m/sec., whereby a porous insulating film having a thickness of 10 μm was formed on each surface of the negative electrode. The porous insulating film had a porosity P of 0.6.

(iv) Preparation of Non-Aqueous Electrolyte

A non-aqueous electrolyte was prepared by dissolving $LiPF_6$ in a non-aqueous solvent mixture comprising ethylene carbonate (EC), dimethyl carbonate (DMC) and ethyl methyl carbonate (EMC) at a volume ratio of 2:3:3 at a $LiPF_6$ concentration of 1 mol/L. Further, VC was added thereto in an amount of 3 parts by weight per 100 parts by weight of the non-aqueous electrolyte.

(v) Production of Battery

Using the positive electrode, negative electrode and non-aqueous electrolyte produced above, a 18650 type cylindrical battery was produced in the following procedure. The positive and negative electrodes were first cut into a predetermined length. One end of a positive electrode lead was connected to the positive electrode lead connecting part. One end of a negative electrode lead was connected to the negative electrode lead connecting part. Subsequently, the positive and negative electrodes were spirally wound with a separator made of a polyethylene resin microporous film having a thickness of 16 µm interposed therebetween to form a columnar electrode group. The outer surface of the electrode group was wrapped by the separator. This electrode group, which was sandwiched by an upper insulating ring and a lower insulating ring, was housed in a battery can.

The ratio R of actual volume to apparent volume of the separator was 0.6. Accordingly, the R–P value was 0.

Subsequently, the non-aqueous electrolyte described above was weighed 5.5 g, which was then injected into the battery can in two separate injection steps. In each injection step, the pressure was reduced to 133 Pa so as to impregnate the electrode group with the non-aqueous electrolyte. In the first injection step, 5 g of the non-aqueous electrolyte was injected into the battery can, and in the second injection step, 0.5 g was injected.

The other end of the positive electrode lead was welded to the underside of a battery lid. The other end of the negative electrode lead was welded to the inner bottom surface of the battery can. Finally, the opening of the battery can was sealed with the battery lid equipped with an insulating packing therearound. Thereby, a cylindrical lithium ion secondary battery having a theoretical capacity of 2 Ah was produced.

COMPARATIVE EXAMPLE 2

A battery was produced in the same manner as in Example 2 except that no porous insulating film was formed on the negative electrode surface.

COMPARATIVE EXAMPLE 3

A battery was produced in the same manner as in Example 2 except that, as the inorganic oxide filler of the porous insulating film, primary particles of Alumina AA03 (trade name) available from Sumitomo Chemical Co., Ltd. were used intact without any heating. The porous insulating film had a porosity P of 0.35. Accordingly, the R–P value was 0.25.

EXAMPLE 3

Batteries were produced in the same manner as in Example 2 except that, in the preparation of the porous film paint, the time for the first mixing was changed to 10, 20, 45 and 60 minutes. The porous insulating films had a porosity P of 0.60, 0.60, 0.58 and 0.55, respectively. Accordingly, the R–P values were 0, 0, 0.02 and 0.05.

EXAMPLE 4

Batteries were produced in the same manner as in Example 2 except that the amount of BM720H serving as the film binder contained in the porous insulating film was changed to 0.5, 1, 2, and 6 parts by weight on a solid content basis per 100 parts by weight of the polycrystalline alumina particles. The porous insulating films had a porosity P of 0.62, 0.61, 0.60 and 0.56, respectively. Accordingly, the R–P values were −0.02, −0.01, 0 and 0.04.

EXAMPLE 5

A battery was produced in the same manner as in Example 2 except that, as the inorganic oxide filler of the porous insulating film, TA300 (trade name)(polycrystalline titania particles with a volume based median size: D50 of 0.4 µm where the primary particles had an average particle size of 0.1 µm) available from Fuji Titanium Industry Co., Ltd. was used. The porous insulating film had a porosity P of 0.48. Accordingly, the R–P value was 0.12.

[Evaluation 2]

The batteries produced in Examples 2 to 5 and Comparative Examples 2 and 3 were subjected to the following evaluation tests.

(Outward Appearance of Porous Insulating Film)

After the application of the porous film paint onto the negative electrode and drying were performed, the porous insulating film was visually checked for the condition immediately after the formation. The porous insulating film exhibiting a problem such as separation was rated as "changed". The rest was rated as "no change". Table 4 shows the relation among the time for the first mixing in the preparation step of the porous film paint, the amount of the film binder expressed in parts by weight per 100 parts by weight of the inorganic oxide filler, and the outward appearance of the negative electrode.

(Pore Size D90)

Using a mercury intrusion porosimeter (9410) available from SHIMADZU CORPORATION, the pore size distribution of the negative electrode having the porous insulating film adhered thereon was measured. As a result, the sum of the pore size distribution of the porous insulating film and that of the negative electrode was obtained. Meanwhile, the pore size distribution of the negative electrode before the porous insulating film was formed was measured. Subsequently, the pore size distribution of the porous insulating film alone was calculated by subtracting the pore size distribution of the negative electrode alone from the sum of the pore size distribution of the porous insulating film and that of the negative electrode. From the above-obtained pore size distribution of the porous insulating film alone, 90% cumulative volume pore size D90 was determined.

(Discharge Characteristic)

The finally produced batteries including electrode groups without any fracture, crack or separation due to the spiral winding process were subjected to pre-charge/discharge twice, after which they were stored in an environment of 45° C. for 7 days. Thereafter, the batteries were subjected to the following two different patterns of charge/discharge in an environment of 20° C.

(1) First Pattern

Constant current charge: 1400 mA (end voltage: 4.2 V)
Constant voltage charge: 4.2 V (end current: 100 mA)
Constant current discharge: 400 mA (end voltage: 3 V)

(2) Second Pattern
Constant current charge: 1400 mA (end voltage: 4.2 V)
Constant voltage charge: 4.2 V (end current: 100 mA)
Constant current discharge: 4000 mA (end voltage: 3 V)

The rate (capacity ratio) of the discharge capacity at 4000 mA to the discharge capacity at 400 mA was calculated in percentage as a measure for discharge characteristic. The larger capacity ratio the battery has, the better the discharge characteristic. Table 5 shows the relation between 90% cumulative volume pore size D90 in the pore size distribution of the porous insulating film contained in each battery and the discharge characteristic of each battery.

(Nail Penetration Test)

The batteries having undergone the charge/discharge characteristic evaluation were charged as follows.
Constant current charge: 1400 mA (end voltage: 4.25 V)
Constant voltage charge: 4.25 V (end current: 100 mA)

Each of the charged batteries was pierced by a round iron nail with a diameter of 2.7 mm from the side thereof in an environment of 20° C. at a speed of 5 mm/sec. or 180 mm/sec., after which the heat generation was observed. The temperature of the pierced portion of the battery was measured 1 second and 90 seconds after the piercing of the battery. Table 6 shows the results of the nail penetration test for each battery.

TABLE 4

| | Inorganic oxide filler | Time for first mixing (min) | Film binder parts by weight | Outward appearance of porous insulating film |
|---|---|---|---|---|
| Ex. 2 | Polycrystalline alumina particles | 30 | 4 | No change |
| Ex. 3 | Polycrystalline alumina particles | 10 | 4 | Changed |
| | Polycrystalline alumina particles | 20 | 4 | No change |
| | Polycrystalline alumina particles | 45 | 4 | No change |
| | Polycrystalline alumina particles | 60 | 4 | No change |
| Ex. 4 | Polycrystalline alumina particles | 30 | 0.5 | Changed |
| | Polycrystalline alumina particles | 30 | 1 | No change |
| | Polycrystalline alumina particles | 30 | 2 | No change |
| | Polycrystalline alumina particles | 30 | 6 | No change |
| Ex. 5 | Polycrystalline titania particles | 30 | 4 | No change |
| Comp. Ex. 2 | — | — | — | — |
| Comp. Ex. 3 | Alumina primary particles | 30 | 4 | No change |

TABLE 5

| | Pore size D90 (μm) | −10° C./20° C. discharge capacity ratio (%) |
|---|---|---|
| Ex. 2 | 0.23 | 94 |
| Ex. 3 | 0.34 | 94 |
| | 0.28 | 93 |
| | 0.17 | 92 |
| | 0.14 | 88 |
| Ex. 4 | 0.32 | 95 |
| | 0.29 | 94 |
| | 0.26 | 94 |
| | 0.13 | 87 |

TABLE 5-continued

| | Pore size D90 (μm) | −10° C./20° C. discharge capacity ratio (%) |
|---|---|---|
| Ex. 5 | 0.22 | 93 |
| Comp. Ex. 2 | — | 95 |
| Comp. Ex. 3 | 0.10 | 85 |

TABLE 6

| | Nail penetration test | | | |
|---|---|---|---|---|
| | Nail piercing speed 5 mm/sec. | | Nail piercing speed 180 mm/sec. | |
| | Temperature 1 second after (° C.) | Temperature 90 second after (° C.) | Temperature 1 second after (° C.) | Temperature 90 second after (° C.) |
| Ex. 2 | 75 | 87 | 74 | 88 |
| Ex. 3 | 76 | 88 | 74 | 84 |
| | 78 | 89 | 75 | 83 |
| | 74 | 87 | 70 | 85 |
| | 79 | 88 | 74 | 87 |
| Ex. 4 | 80 | 88 | 75 | 84 |
| | 77 | 89 | 68 | 85 |
| | 76 | 91 | 75 | 85 |
| | 78 | 91 | 76 | 85 |
| Ex. 5 | 78 | 90 | 74 | 86 |
| Comp. Ex. 2 | 149 | — | 137 | — |
| Comp. Ex. 3 | 77 | 94 | 75 | 87 |

The evaluation results are discussed below.

The battery having the negative electrode of Comparative Example 2 without the porous insulating film exhibited a significant temperature rise when the battery was pierced by the nail especially at a low rate. This is because the conventional polyethylene resin separator melted due to heat generated during short circuit caused by the penetration of the nail, and the short-circuited area was enlarged.

The negative electrode of Comparative Example 3 having the porous insulating film formed on the negative electrode surface exhibited satisfactory result in the nail penetration test. It was, however, significantly inferior to that of Comparative Example 2 in terms of discharge characteristic. This is because the porous insulating film of Comparative Example 2 had too small a pore size D 90 measured by the mercury intrusion porosimeter, namely 0.10 μm. Presumably, when the pore size D90 is excessively small, the porous insulating film cannot maintain its capability to retain electrolyte or ion conductivity sufficiently after the swelling of the film binder.

Contrary to Comparative Examples 2 and 3, the battery of Example 2 having the porous insulating film made of inorganic oxide filler composed of polycrystalline alumina particles and a small amount of film binder achieved results almost equal to those of Comparative Example 2 in terms of safety in the event of nail penetration and discharge characteristic. This is because the porous insulating film of Example 2 had a sufficiently large pore size D90 of 0.23 μm, so that the capability to retain electrolyte or ion conductivity of the porous insulating film was ensured sufficiently even after the swelling of the film binder. The battery of Example 5 having the inorganic oxide filler composed of, instead of alumina, polycrystalline titania particles exhibited similar results as that of Example 2.

The results of Example 3 indicate that, when the time for the first mixing was excessively long in the preparation step of the porous film paint, the film binder was excessively dispersed and the pore size D90 became small, failing to achieve a high level of discharge characteristic. Conversely, when the time for the first mixing was excessively short, satisfactory discharge characteristic and safety in the event of nail penetration were obtained, but the separation of the porous insulating film was observed. Presumably, this is because the first mixing was insufficient and the film binder coagulated excessively: as a result, the adhesion strength was low.

The results of Example 4 indicate that, when the amount of the film binder was excessively large, the pore size D90 became small, failing to achieve a high level of discharge characteristic. Conversely, when the amount of the film binder was reduced to 0.5 parts by weight per 100 parts by weight of the inorganic oxide filler, although satisfactory discharge characteristic and safety in the event of nail penetration were obtained, the separation of the porous insulating film was observed. This is presumably because the adhesion strength was insufficient.

Although the electrode plate portion without the separation of the porous insulating film is usable for the production of batteries, from the viewpoint of preventing the reduction of the production yield, it is desirable to perform the first mixing properly and to use the film binder in an amount of at least 1 part by weight or more per 100 parts by weight of the inorganic oxide filler.

EXAMPLE 6

(i) Production of Positive Electrode

A positive electrode material mixture paste was prepared by mixing with stirring 3 kg of lithium cobalt oxide (positive electrode active material), 1 kg of #1320 (trade name) available from Kureha Chemical Industry Co., Ltd. (an NMP solution containing 12% by weight PVDF (positive electrode binder)), 90 g of acetylene black (conductive material) and an appropriate amount of NMP with the use of a double arm kneader. This paste was applied onto both surfaces of a 15 μm thick aluminum foil (positive electrode current collector) except for the positive electrode lead connecting part. The dried films were rolled by rollers to form positive electrode material mixture layers. Thereby, a positive electrode hoop was produced. During the formation of the positive electrode material mixture layers, the thickness of the electrode plate composed of the aluminum foil and the positive electrode material mixture layers was controlled to be 160 μm. Then, the electrode plate was cut into a size of 60 mm in width and 500 mm in length to obtain a positive electrode.

(ii) Production of Negative Electrode

A negative electrode material mixture paste was prepared by mixing with stirring 2 kg of artificial graphite (negative electrode active material), 75 g of BM-400B (trade name) available from ZEON CORPORATION (an aqueous dispersion containing 40% by weight modified form of styrene-butadiene copolymer (negative electrode binder)), 30 g of CMC (thickener) and an appropriate amount of water with the use of a double arm kneader. This paste was applied, by die coating method, onto both surfaces of a 10 μm thick copper foil (negative electrode current collector) except for the negative electrode lead connecting part. Here, the paste was applied onto the copper foil at a speed of 0.2 m/min. The copper foil having coating layers formed thereon was passed through a drying oven at the same speed as above to dry the coating layers. The dried coating layers were rolled by rollers to form negative electrode material mixture layers. Thereby, a negative electrode hoop was produced. During the formation of the negative electrode material mixture layers, the thickness of the electrode plate composed of the copper foil and the negative electrode material mixture layers was controlled to be 180 μm. The obtained negative electrode material mixture layers had an average surface roughness Ra of 0.21 μm. The average surface roughness Ra was measured using "Surfcom", a surface roughness measuring instrument available from TOKYO SEIMITSU CO., LTD.

(iii) Formation of Porous Insulating Film

As the inorganic oxide filler, alumina having an average particle size (volume based median size: D50) of 0.5 μm and a bulk density (tap density) of 0.6 g/cm$^3$ was used. A porous film paint was prepared by mixing with stirring 950 g of the inorganic oxide filler, 475 g of BM720H (trade name) available from ZEON CORPORATION (an NMP solution containing 8% by weight polyacrylonitrile derivative (film binder)) (i.e., 4 parts by weight film binder per 100 parts by weight polycrystalline particles) and 2725 g of NMP with the use of a double arm kneader.

The obtained porous film paint was applied onto both surfaces of the above-produced negative electrode hoop by gravure roll method at a speed of 1 m/min., which was then dried by hot air at 150° C. blown at an air flow rate of 10 m/sec., whereby a porous insulating film having a thickness of 5 μm and adhered on each surface of the negative electrode was formed. Thereafter, the negative electrode hoop having the porous insulating films adhered to both surfaces thereof was cut into a size of 62 mm in width and 570 mm in length to produce a negative electrode having the porous insulating films adhered to both surfaces thereof. The porous insulating films had a porosity P of 0.55.

(iv) Preparation of Non-aqueous Electrolyte

A non-aqueous electrolyte was prepared by dissolving $LiPF_6$ in a non-aqueous solvent mixture comprising ethylene carbonate (EC) and ethyl methyl carbonate (EMC) at a volume ratio of 1:3 at a $LiPF_6$ concentration of 1 mol/L. Further, VC was added thereto in an amount of 3 parts by weight per 100 parts by weight of the non-aqueous electrolyte.

(v) Production of Battery

Using the positive electrode, negative electrode and non-aqueous electrolyte produced above, a cylindrical lithium ion secondary battery was produced in the following procedure. Firstly, one end of a positive electrode lead was connected to the positive electrode lead connecting part. One end of a negative electrode lead was connected to the negative electrode lead connecting part. Subsequently, the positive and negative electrodes were spirally wound with a separator made of a polypropylene resin microporous film (thickness: 16 μm, porosity: 45% (R=0.55)) interposed therebetween to form a columnar electrode group. The outer surface of the electrode group was wrapped by the separator. This electrode group, which was sandwiched by an upper insulating ring and a lower insulating ring, was housed in a cylindrical battery can having a diameter of 18 mm and a height of 670 mm.

The ratio R of actual volume to apparent volume of the separator was 0.55. Accordingly, the R–P value was 0.

The other end of the positive electrode lead was welded to the underside of a battery lid equipped with an insulating packing therearound. The other end of the negative electrode lead was welded to the inner bottom surface of the battery can. Finally, the opening of the battery can was sealed with the battery lid. Subsequently, the above-prepared non-aqueous electrolyte was injected from an injection inlet of the battery lid into the battery can in two separate injection steps. In each injection step, the pressure was reduced to 133 Pa so as to impregnate the electrode group with the non-aqueous electrolyte. In the first injection step, 5 g of the non-aqueous electrolyte was injected into the battery can, and in the second injection step, 0.5 g was injected. Finally, the injection inlet was sealed. Thereby, a cylindrical lithium ion secondary battery (hereinafter referred to as battery 1) was produced.

COMPARATIVE EXAMPLE 4

A battery (hereinafter referred to as battery R) was produced in the same manner as in Example 6 except that, in the formation step of the porous insulating film, the porous film paint applied onto both surfaces of the negative electrode hoop was dried at a temperature of 40° C. The porous insulating films had a porosity P of 0.55. Accordingly, the R–P value was 0.

EXAMPLE 7

Batteries 2, 3, 4, 5 and 6 were produced in the same manner as in Example 6 except that, in the production step of the negative electrode, the speed at which the negative electrode material mixture paste was applied onto both surfaces of the copper foil and then dried was changed to 0.05 m/min., 0.1 m/min., 0.5 m/min., 0.8 m/min. and 1.1 m/min., and that the average surface roughness Ra of the negative electrode material mixture layers was changed to 0.06 µm, 0.13 µm, 0.62 µm, 0.97 µm and 1.24 µm, respectively. The porous insulating films had a porosity P of 0.55, 0.55, 0.55, 0.55 and 0.55, respectively. Accordingly, the R–P values were all 0.

[Evaluation 3]

The batteries produced in Examples 6 and 7 and Comparative Example 4 were subjected to the following evaluation tests.

(Separation of Porous Insulating Film)

The outward appearance of the porous insulating film formed on the negative electrode surface immediately after the drying was visually checked to see if there was any separation.

(SEM Observation)

The negative electrode having the porous insulating films adhered thereon was cut. Without performing any treatment such as metal vapor deposition, the cross section of the negative electrode was observed using a scanning electron microscope (S-4500 available from Hitachi, Ltd.) at an accelerating voltage of 5 kV.

(Pore Size Distribution)

The negative electrode having the porous insulating films adhered thereon was cut into nine rectangles, each having a size of 2 cm×1 cm. The obtained nine rectangular pieces of the electrode plate were treated as a single sample, which was introduced into a measurement cell of a porosimeter. The pore size distribution of the sample electrode plate was measured by mercury intrusion method. As the measurement device (porosimeter), Autopore III9410 available from SHIMADZU CORPORATION was used. The pressure for measurement ranged from 4 to 60000 psia. Under this pressure condition, the pore size distribution ranging from 0.003 to 50 µm can be measured. In the same manner as above, the pore size distribution of the negative electrode before the porous insulating film was adhered thereon was determined.

(Discharge Characteristic)

Each battery was subjected to discharge test at a low temperature as follows.

Each battery was charged at a constant voltage of 4.2 V with a maximum charge current of 1400 mA at an environmental temperature of 20° C. for 2 hours, and then discharged at a constant current of 2000 mA with an end-of-discharge voltage of 3.0 V at an environmental temperature of 20° C. Thereby, the discharge capacity at 20° C. was measured.

Subsequently, the battery having been discharged at 20° C. was again charged under the same conditions as above, after which the charged battery was cooled down at an environmental temperature of −10° C. for 6 hours. At the same environmental temperature of −10° C., the battery having cooled down was discharged at a constant current of 2000 mA with an end-of-discharge voltage of 3.0 V. Thereby, the discharge capacity at −10° C. was measured.

The rate of the discharge capacity at −10° C. to the discharge capacity at 20° C. was calculated in percentage, and the rate was referred to as low temperature discharge retention rate (−10° C./20° C. discharge capacity ratio).

The evaluation results of Examples 6 to 7 and Comparative Example 4 are discussed below.

Figure 3:
FIG. 3 is an SEM image of a cross section of a negative electrode to which a porous insulating film is adhered.

FIG. 3 is an SEM image of a cross section of the negative electrode of Comparative Example 4 having the porous insulating films adhered thereon. The upper layer is the porous insulating film. The bottom layer is the negative electrode material mixture layer. A void can hardly be found at the adhering interface between the porous insulating film and the negative electrode material mixture layer. This is presumably because since the application step of the porous insulating film to the negative electrode surface and the drying step were performed at 40° C., the paint retained high fluidity for a relatively long time, and the porous film paint infiltrated into the recesses on the negative electrode surface: as a result, the recesses were filled with the paint.

Figure 4:
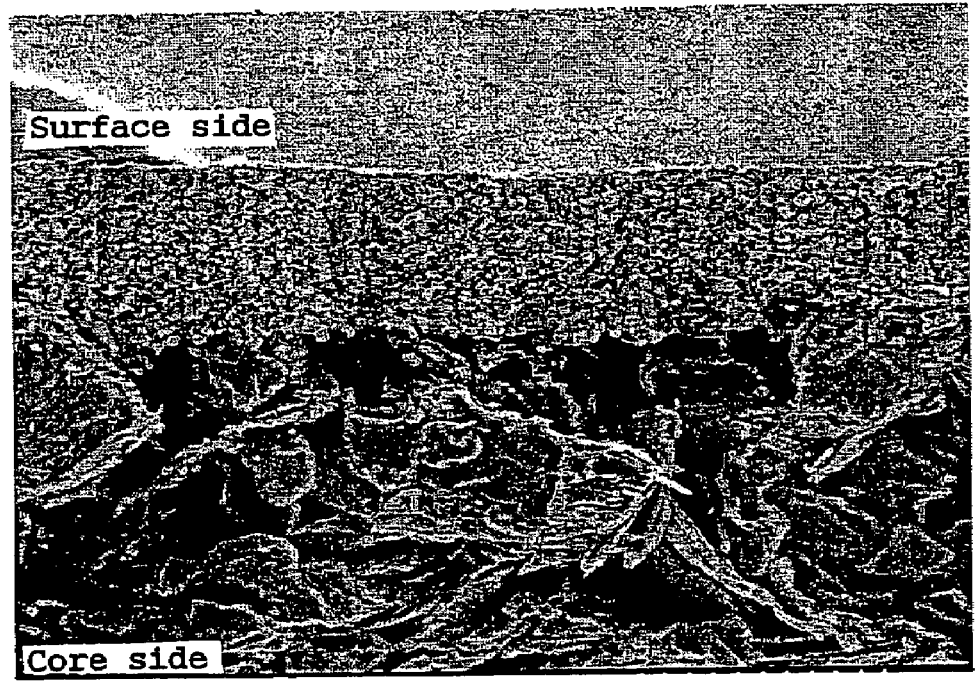
FIG. 4 is an SEM image of a cross section of a negative electrode to which a porous insulating film is adhered.

FIG. 4 is an SEM image of a cross section of the negative electrode of Example 6 having the porous insulating films adhered thereon. The upper layer is the porous insulating film. The bottom layer is the negative electrode material mixture layer. At the adhering interface between the porous insulating film and the negative electrode material mixture layer, relatively large voids are formed. This is presumably because the application step of the porous insulating film to the negative electrode surface and the drying step were performed at 150° C., and the paint had lost its fluidity so that the paint did not infiltrate into the recesses on the negative electrode surface.

Figure 5:
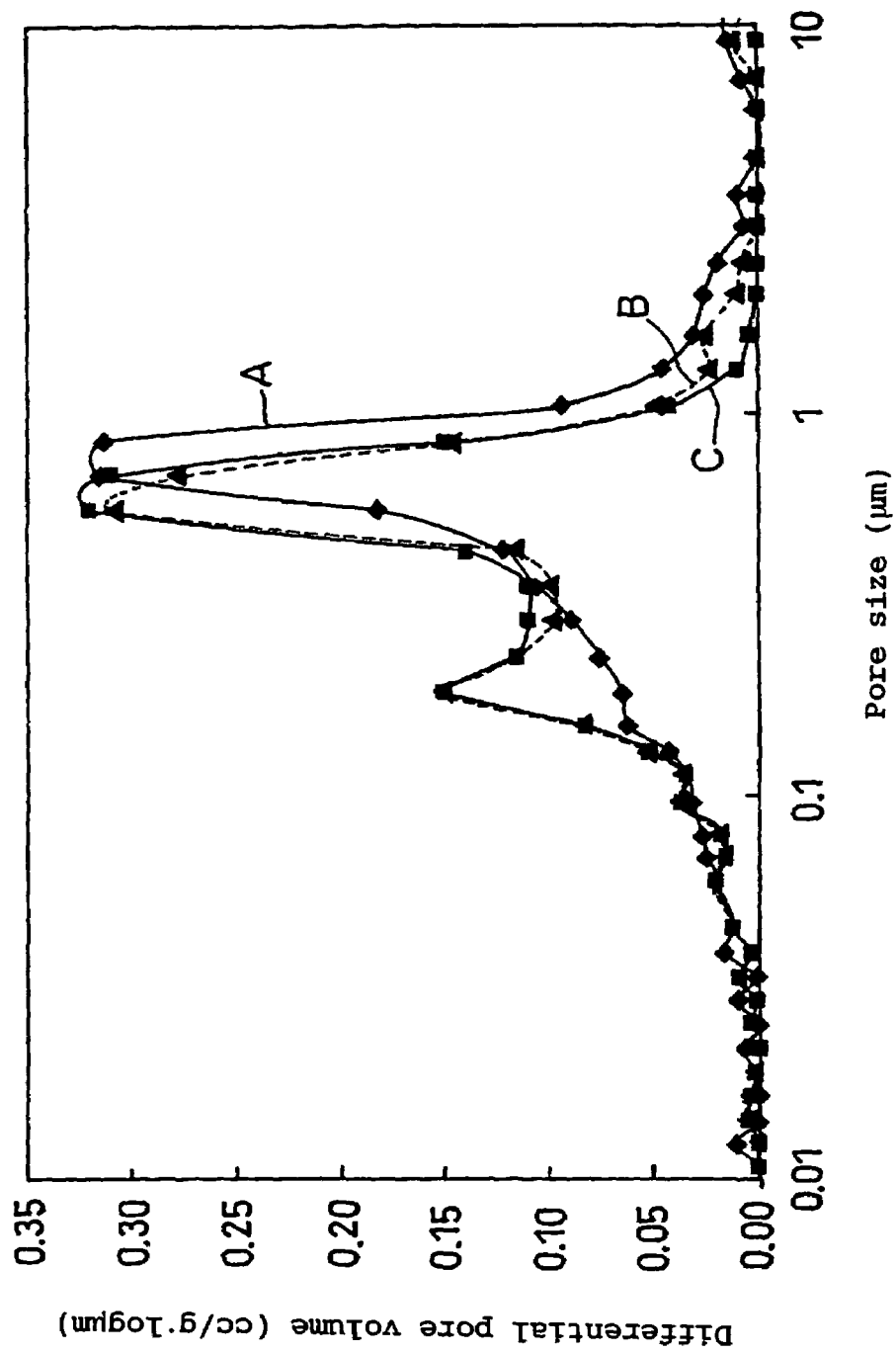
FIG. 5 is a graph showing the pore size distributions of negative electrodes and porous insulating films determined by a mercury intrusion porosimeter.

FIG. 5 is a graph showing the pore size distribution (A) for the negative electrode before the porous insulating films were adhered, the pore size distribution (B) for the sample electrode plate of Example 6 having the porous insulating films adhered thereon and the pore size distribution (C) for the sample electrode plate of Comparative Example 4 having the porous insulating films adhered thereon, all of which were determined by the mercury intrusion porosimeter. The distributions (B) and (C) in FIG. 5 include the voids of the porous insulating film, the voids of the negative electrode and the voids at the adhering interface between the porous insulating film and the electrode surface.

As seen from FIG. 5, in the pore size distribution (A) of the negative electrode serving as the base for the porous insulating film, there exist pores having a diameter of about 2 µm which can be considered as the asperity on the negative electrode surface. In the pore size distribution (C) of the porous insulating film formed through the application and drying steps of the porous film paint performed at 40° C., no peak can be found in the range of 1 µm and greater. This suggests that the asperity existed on the negative electrode surface was filled with the porous insulating film. On the other hand, in the pore size distribution (B) of the porous insulating film formed through the application and drying steps of the porous film paint performed at 150° C., a peak can be seen at about 1.5 µm. This suggests that voids having a size of about 1.5 µm exist at the adhering interface between the porous insulating film and the negative electrode surface of Example 6. These results agree with those obtained by the SEM observation.

Table 7 shows the information about the negative electrodes and the porous insulating films produced in Examples 6 and 7 and Comparative Example 4, and the results of the low temperature discharge retention rate of those batteries. It should be noted that, among the peaks in the pore size distribution, a size that corresponds to a peak that can be attributed to the void at the adhering interface between the porous insulating film and the negative electrode surface is taken as void size at the adhering interface.

TABLE 7

| | Battery | Negative electrode | | Porous insulating film | | | Low temperature discharge retention rate |
| --- | --- | --- | --- | --- | --- | --- | --- |
| | | Application/Drying speed (m/min.) | Ra (μm) | Application/Drying temperature (° C.) | Size of void at adhering interface (μm) | Presence of separation | −10° C./20° C. discharge capacity ratio (%) |
| Ex. 6 | Battery 1 | 0.2 | 0.21 | 40 | None | No | 88 |
| Comp. Ex. 4 | Battery R | 0.2 | 0.21 | 150 | 1.48 | No | 96 |
| Ex. 7 | Battery 2 | 0.05 | 0.06 | 150 | 0.72 | No | 93 |
| | Battery 3 | 0.1 | 0.13 | 150 | 1.05 | No | 95 |
| | Battery 4 | 0.5 | 0.62 | 150 | 2.49 | No | 96 |
| | Battery 5 | 0.8 | 0.97 | 150 | 3.87 | No | 97 |
| | Battery 6 | 1.1 | 1.24 | 150 | 4.92 | Partially | 97 |

In the case of Comparative Example 4, the discharge capacity retention rate at −10° C. was 88% whereas, in Example 6, the discharge capacity retention rate at −10° C. increased to as high as 96%. This is because the porous film paint was formed without filling the recesses on the negative electrode surface, and voids capable of retaining non-aqueous electrolyte were formed at the adhering interface between the porous insulating film and the negative electrode surface: as a result, satisfactory ion conductivity was ensured in the negative electrode.

In Example 7, when the average roughness Ra of the negative electrode surface serving as the base for the porous insulating film was ranged from 0.13 to 0.97 μm, the peaks to be attributed to the void formed on the adhering interface between the porous insulating film and the negative electrode surface were observed in the range from 1.05 to 3.87 μm in the pore size distributions. In this case, low temperature discharge retention rates similar to that of Example 6 were achieved.

On the other hand, in Example 7, when the average surface roughness Ra of the negative electrode surface was less than 0.1 μm (0.06 μm), the peak in the pore size distribution to be attributed to the void formed on the adhering interface was observed at 0.72 μm which was relatively small. In this case, the low temperature discharge retention rate decreased to a certain extent compared to that of Example 6.

Further, in Example 7, when the average surface roughness Ra of the negative electrode surface exceeded 1 μm (1.24 μm), the peak in the pore size distribution to be attributed to the void formed on the adhering interface was observed at 4.92 μm which was relatively large. In this case, satisfactory low temperature discharge retention rate was obtained, but the separation of the porous insulating film from the negative electrode surface was found.

From the above, the following is clear. In order to significantly improve low temperature discharge retention rate while maintaining the adhesion strength between the porous insulating film and the electrode surface, it is effective to set the peak to be attributed to the void formed on the adhering interface between the porous insulating film and the electrode surface to 1 to 4 μm in the pore size distribution. To that end, it is effective to set the average roughness Ra of the electrode surface to 0.1 to 1 μm.

INDUSTRIAL APPLICABILITY

The non-aqueous electrolyte secondary battery of the present invention is useful as portable power sources having excellent safety. The present invention is suitable for lithium ion secondary batteries including the porous insulating film adhered on the surface of an electrode which are specifically designed to secure thermal resistance and safety against short circuit and the batteries can achieve excellent discharge characteristic.

The invention claimed is:

1. A non-aqueous electrolyte secondary battery comprising: a positive electrode; a negative electrode; a separator interposed between said positive electrode and said negative electrode; a non-aqueous electrolyte; and a porous insulating film adhered to a surface of at least one selected from the group consisting of said positive electrode and said negative electrode, said porous insulating film comprising an inorganic oxide filler and a film binder, wherein the ratio R of actual volume to apparent volume of said separator is not less than 0.4 and not greater than 0.7, a porosity P of said porous insulating film is not less than 0.35 and not greater than 0.65, and wherein said ratio R and a porosity P of said porous insulating film satisfy the relational formula:

$$-0.10 \leq R-P \leq 0.30.$$

2. The non-aqueous electrolyte secondary battery in accordance with claim 1, wherein the amount of said film binder contained in said porous insulating film is not less than 1 part by weight and not greater than 4 parts by weight per 100 parts by weight of said inorganic oxide filler.

* * * * *